United States Patent
Bell et al.

(10) Patent No.: US 6,545,216 B1
(45) Date of Patent: Apr. 8, 2003

(54) ELECTRICAL BOX FOR SUPPORTING VARIOUS FIXTURES HAVING DIFFERENT FIXTURE FASTENER OFFSET WIDTHS

(75) Inventors: Rebekah E. Bell, Tully, NY (US); Richard H. Weeks, Little York, NY (US)

(73) Assignee: Reiker Enterprises of Northwest Florida, Inc., Solvay, NY (US)

( * ) Notice: Subject to any disclaimer, the term of this patent is extended or adjusted under 35 U.S.C. 154(b) by 0 days.

(21) Appl. No.: 09/994,619

(22) Filed: Nov. 28, 2001

(51) Int. Cl.[7] .................................................. H05K 5/00
(52) U.S. Cl. ........................... 174/50; 174/50; 174/54; 174/57; 220/3.2; 220/3.7; 248/906; 248/406
(58) Field of Search ............................. 174/50, 54, 57; 220/3.2, 3.7; 248/906, 406

(56) References Cited

U.S. PATENT DOCUMENTS

| | | | |
|---|---|---|---|
| 5,728,973 A | * 3/1998 | Jorgensen | 174/65 R |
| 5,824,952 A | 10/1998 | Bordwell et al. | 174/53 |
| 5,857,581 A | * 1/1999 | Jorgensen | 220/3.2 |
| 5,883,331 A | * 3/1999 | Reiker | 174/54 |
| 5,950,853 A | * 9/1999 | Jorgensen | 220/3.2 |
| 6,036,337 A | 3/2000 | Belfer | 362/287 |
| 6,170,685 B1 | 1/2001 | Currier | 220/3.3 |

* cited by examiner

*Primary Examiner*—Dean A. Reichard
*Assistant Examiner*—Anton Harris
(74) *Attorney, Agent, or Firm*—Shlesinger, Arkwright & Garvey LLP

(57) ABSTRACT

Mounting assembly includes a junction box having a top wall and a downwardly extending side wall defining a cavity therein. A fixture support is provided on the junction box that has a first use position and a second use position, and the fixture support is movable from the first use position to the second use position. Mounting assembly may include a junction box with a fixture support attached to the junction box, and a first fixture fastener provided on a fixture support. The first fixture fastener may be sized for securing a first type of fastener. A second fixture fastener sized for securing a second size of fastener may be provided on the fixture support. The fixture support is moveable between a use position for the first fixture fastener and a non-use position for the first fixture fastener. The first and second fixture support may be movable, such as by rotation relative to a part of the junction box.

38 Claims, 8 Drawing Sheets

ELECTRICAL BOX FOR SUPPORTING VARIOUS FIXTURES HAVING DIFFERENT FIXTURE FASTENER OFFSET WIDTHS

CROSS REFERENCE TO RELATED APPLICATIONS

This application relates to application Ser. No. 09/994,618 to Weeks, filed herewith, and which is incorporated herein by reference.

FIELD OF THE INVENTION

This invention relates to mounting assemblies. More specifically, this invention relates to junction boxes which are suited for supporting different types and sizes of fixtures having different sizes and types of fixture fasteners. Even more particularly, the invention relates to junction boxes suited for alternately supporting different types of fixture fasteners and different fixture fastener offset widths for electrical fixtures, such as lightweight fixtures, ceiling fans, chandeliers, and heavy duty light fixtures, chandeliers, and ceiling fans, which may have different widths between adjacent ones of fixture fasteners, for example.

BACKGROUND OF THE INVENTION

Mounting assemblies including junction boxes are known.

Examples of known load supporting electrical boxes include the following patents to Reiker: U.S. Pat. Nos. 5,854,443; 5,883,331; 5,907,124; 5,981,874; 5,677,512; U.S. Pat. No. Re. 33,147; U.S. Pat. No. Des. 288,289; U.S. Pat. Nos. 4,684,092; 4,463,923; 5,965,845; 5,661,264; 5,942,726; 6,096,974; 5,909,006; 5,873,556; 5,938,157; 6,207,897; 6,204,450; 6,207,894; 6,207,898; 6,242,696; 6,281,439; and 6,291,768.

OBJECTS AND SUMMARY OF THE INVENTION

It is an object of the invention to provide a two-in-one junction box; i.e., a box which can be used to support at least two types of fixtures, such as light fixtures, ceiling fans, and chandeliers.

It is yet another object of the invention to provide a junction box which can be readily converted from a light fixture junction box to a ceiling fan/chandelier supporting junction box and vice-versa.

It is another object of the invention to provide a junction box which is stronger than conventional junction boxes.

Yet another object of the invention is to provide a junction box which is stronger than conventional junction boxes with the addition of a few additional components.

It is a still further object of the invention to provide a junction box convertible from a fixture support sized for a first size of fixture fastener to a fixture support sized for a second size of fixture fastener, the second size of fixture fastener differing from the first size of fixture fastener.

It is another object of the invention to provide a junction box which is convertible from one type of fixture fastener to a different type of fixture fastener.

It is a still further object of the invention to provide a junction box convertible from a fixture support sized for a first size of fixture fastener to a fixture support sized for a second size of fixture fastener that differs from the first size of fixture fastener, while maintaining or varying a predetermined fixture fastener offset.

It is another object of the invention to provide a junction box which is convertible from one type of fixture fastener to a different type of fixture fastener, while maintaining or varying a predetermined fixture fastener offset.

Another object of the invention is to provide a junction box which is more cost-effective to produce.

A further object of the invention is to provide a junction box which is easier to assemble than known junction boxes.

Yet another object of the invention is to provide a two-in-one type junction box having a fixture support suited for supporting two different types of fixtures requiring two different sizes of fixture fasteners, or two different offsets between adjacent fixture fasteners, and that has only one outwardly facing size of fixture support at a time; e.g., so that the user always knows with certainty which fixture support is to be used for which fixture fastener or for which fixture fastener width offset.

Yet another object of the invention is to provide a junction box which can accommodate substantially any length or offset width of fixture fastener.

In summary, the invention is directed to a mounting assembly including a junction box having a top wall and a downwardly extending side wall defining a cavity therein. A fixture support is provided on the junction box that has a first use position and a second use position, and the fixture support is usable in the first use position or the second use position to establish a different fixture fastener offset width.

The invention is likewise directed to a mounting assembly including a junction box having a top wall and a downwardly extending side wall defining a cavity therein. A fixture support is attached to the junction box, and a first fixture fastener is provided on a fixture support. The first fixture fastener is sized for securing a first type of fixture fastener having a first offset width. A second fixture fastener sized for securing a second size and/or offset width of fixture fastener may be provided on the fixture support. The fixture support is moveable between a use position for the first fixture fastener and a non-use position for the first fixture fastener.

Relative terms such as up, down, left, and right are for convenience only and are not intended to be limiting.

The term "non-use position" does not mean that the position has no use; rather, it means in the case of the fixture support described below, for example, that it is free to be used for a different purpose, and it is not being used for supporting an outwardly extending fixture fastener, for example; in other words, there may be a different use for the fixture fastener in its non-use position, such different use being a use other than being used as one of the main supports for a fixture. If may be used to provide supplemental support to a fixture or to indicate which fixture support is not being used; hence, which of two fixture supports is being used, by process of elimination.

The term "offset width", or "use width", means the distance between, for example, two(2) fixture fasteners of a fixture to be supported, that the corresponding two(2) fixture fasteners on the two(2) fixture supports of the junction box must match. For example, if a light fixture to be supported by a junction box according to the invention has two(2) attachment points located 3½ inch (8.9 cm) apart from each other (i.e., a 3½ inch offset width) and at which 8–32 screws are attached, then the inventive junction box would be provided with two(2) 8-32 female fasteners offset 3½ inch (8.9 cm) apart to receive the 8-32 male fasteners (such as screws) used to attach the light fixture to the junction box of the mounting assembly.

DETAILED DESCRIPTION OF THE INVENTION

Figure 1:
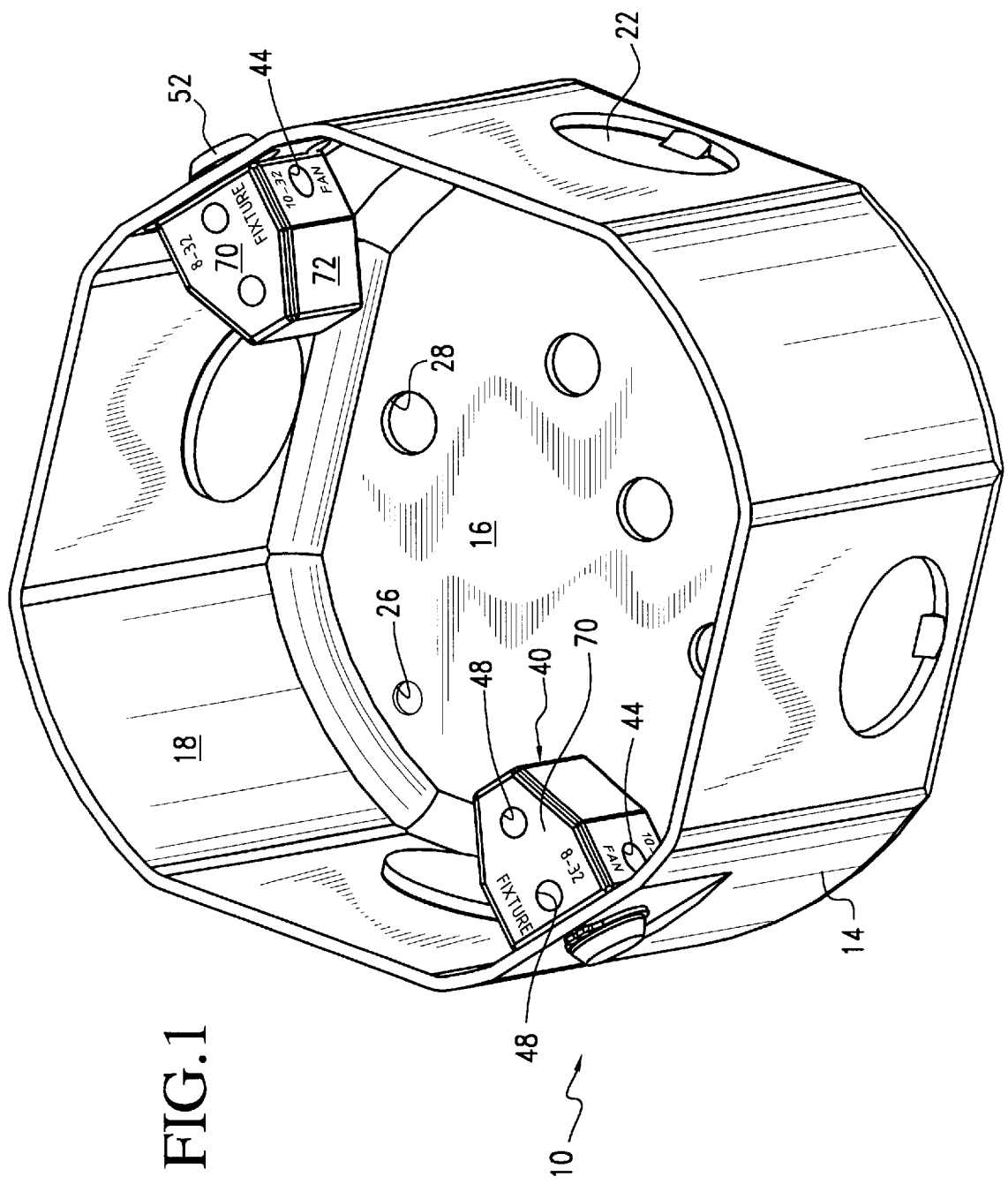
FIG. 1 illustrates an embodiment of an electrical box according to the invention.
Figure 2:
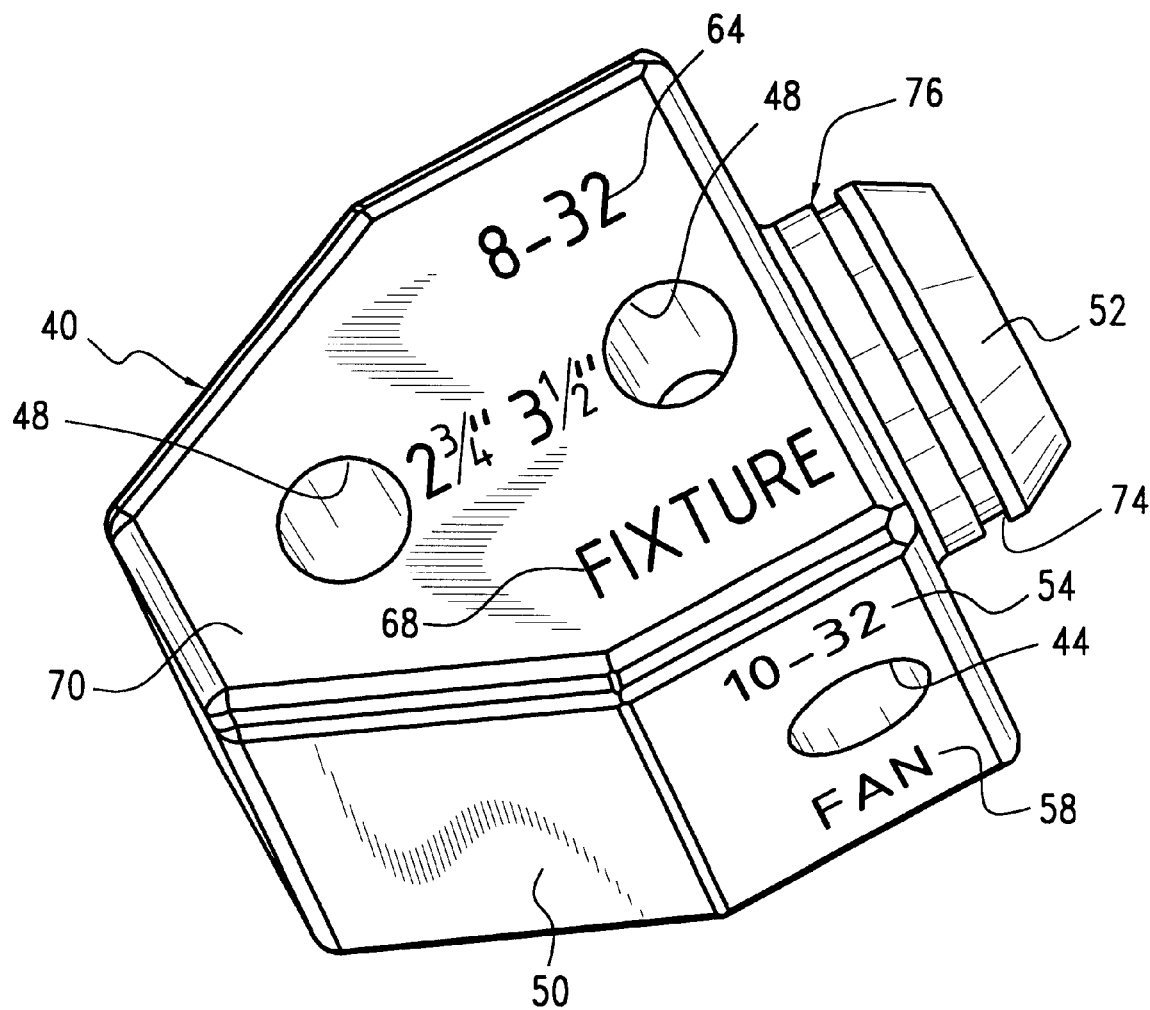
FIG. 2 shows a fixture support used in the embodiment of FIG. 1, on an enlarged scale.
Figure 4:
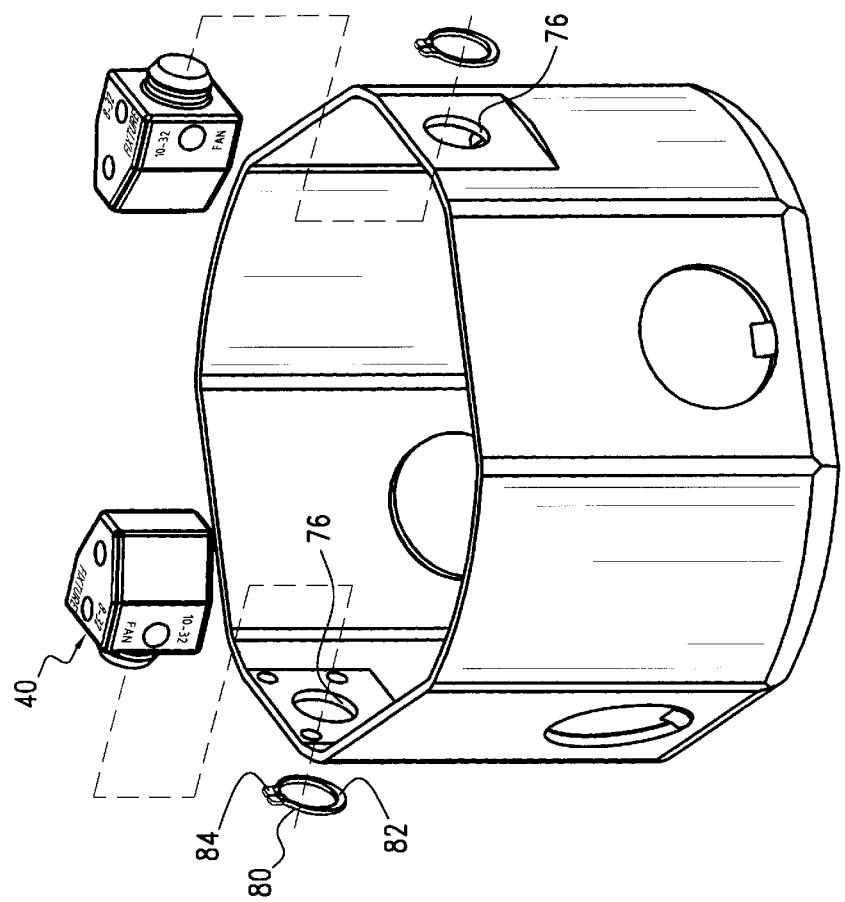
FIG. 4 is an exploded view of the embodiment of FIG. 1 and similar to the view of FIG. 3.
Figure 3:
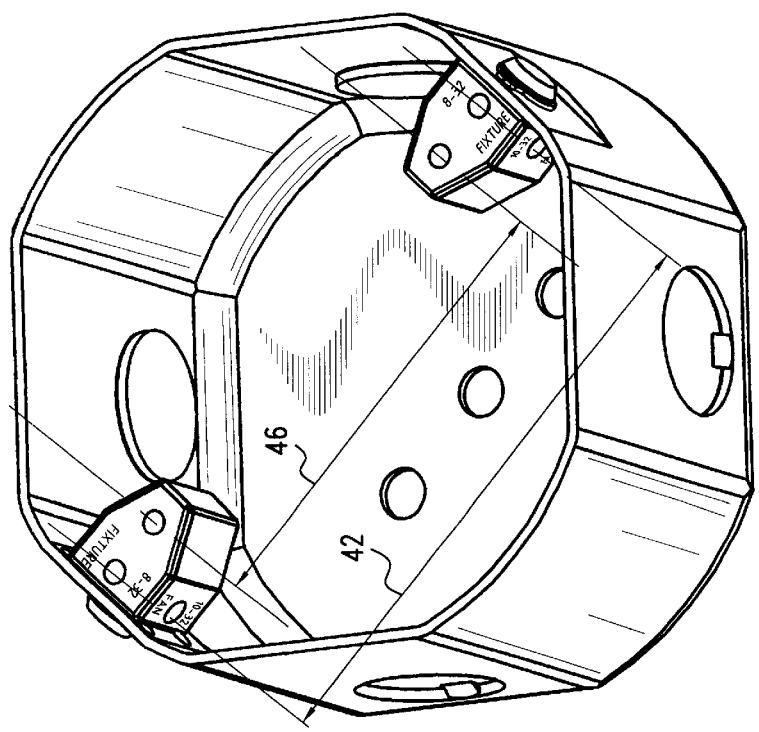
FIG. 3 is a further perspective view of the embodiment of FIG. 1, illustrating the different fixture fastener offset widths which may be obtained by use of the electrical box according to the invention.

FIGS. 1–4 illustrate an embodiment of a mounting assembly 10 according to the invention.

Mounting assembly 10 may include a junction box 14 having a top wall 16 and a downwardly extending side wall 18. Top wall 16 and side wall 18 define a junction box cavity therein. The cavity may be used in a conventional manner to enclose electrical wiring associated with an electrical fixture, such as a light fixture, ceiling fan, or chandelier, for example. Such electrical fixtures may be supported by junction box 10, as will be described below.

Junction box 10 may include so-called knock-outs 22, which are removable, and when partially or completed removed, in use, leave apertures through which wiring may be inserted, in a known manner.

A hole 26, which may be pre-threaded, may be provided in top wall 16, and may receive a conventional pre-threaded or self-tapping grounding screw which may be inserted and attached.

One or more further threaded or unthreaded apertures 28 may be provided in top wall 16.

Such apertures 28 may be sized and located for use as attachment sites, through which screws or nails will be inserted for attaching electrical box 10 to a support, such as an unillustrated stud, brace, or joist, for example, in a known fashion.

One or more fixture supports 40 may be provided.

Fixture supports 40 may be sized for supporting light-weight fixtures, such as lights, or supports 40 may be sized for supporting heavy duty light fixtures, ceiling fans, and/or chandeliers, and may be heavy duty fixture supports in accordance with the National Electrical Code (N.E.C.) of the United States, and or the International Standards Organization (ISO), or Deutsche Industrie Norm (DIN) standards, and the like.

Fixture support 40 may be provided, at a first offset or use width 42, with at least one size of fixture fastener 44 sized for securing a standard $10/32$ inch male fastener of the type conventionally required for chandeliers of 35 pounds or more or 50 pounds or more, per local and national building codes, for example. In that case, fastener 44 would be the illustrated female fastener; e.g., a threaded hole.

Alternatively, it is contemplated that fastener 44 be a male fastener to which a female fastener, such as a mating nut be attached.

Offset width 42 may be 2.75" (7.0 cm) for use with certain types and brands of fixtures.

Further, a second size of fixture fastener 48, likewise at first offset width 42, may be provided. Fixture fastener 48 may differ in size from fastener 44 so that a different size of a mating fixture fastener of a fixture to be attached can be mated with and attached thereto. Fixture fastener 48 may be the illustrated $8/32$ inch female fastener (i.e., the threaded hole, as shown). As with fixture fastener 44, fixture fastener 48 may be male or female, of any size, or sized in accordance with known standards.

For certain applications, fixture fasteners 44 and 48 may be of the same size and/or one may be made as a female fastener and the other one may be made as a male fastener.

In addition, a further fixture support 48 may be provided at a second offset or use width 46. Offset width 46 may be 3.5 in. (8.9 cm), for example, for use with certain types and brands of fixtures.

Fixture support 40 may be attached to junction box 14, such as adjacent the wall 18. Fixture support 40 may be directly attached to wall 18 by the provision of an extension 52 provided on a block 50, for example. Extension 52 may be sized so that fixture support 40 can support light or heavy fixtures, such as light fixtures and chandeliers/ceiling fans, respectively.

Needless to say, fixture support 40 may likewise be appropriately sized.

Conveniently, an indicia 54, such as the illustrated "10-32" may be placed on fixture support 40. Conveniently, indicia 54 may be located substantially adjacent to fixture fastener 44, and may have the designated illustrated fastener size.

In addition, a further or alternate indicia 58, such as the illustrated name or label "FAN" may be provide as a further size indicator or as a substitute for the numeric size indicia. The label "FAN" may assist users who are unsure as to the appropriate fastener size, or who simply would like reassurance that he or she has selected the proper fixture fastener to which the mating fixture fastener of the electrical fixture itself should be attached.

A first offset or use width indicia 60, such as the illustrated "2¾", may be provided, as well as a second offset or use width indicia 62 (e.g., the illustrated "3½"). The offset width indicia 60 and 62 provide guidance to the user regarding which ones of the corresponding fixture fastener offsets should be used, in the case where a user would like guidance or additional assurance that the correct two(2) or more fixture fasteners 48, for example, have been selected.

In an analogous fashion, a further indicia 64, such as an illustrated size indicia "8-32" may be provided; again, a still further indicia 68, such as the illustrated label "FIXTURE" may be provided.

The variety and disposition of indicia 64 and 68 may be provided in a manner similar to the manner in which indicia 54 and 58 are provided, as described above.

The labels "FAN" and "FIXTURE" are merely examples. Any appropriate indicia such as "FAN/chan." and/or "FIXT/light" may be substituted, in any language(s) or symbol(s). The size indicia may be ISO or DIN standards or symbols, for example.

Fixture fastener 40 may be configured so that fixture fastener 44 ("FAN") or fixture fastener 48 ("FIXTURE") may be available to receive the mating like fixture fastener or ceiling fan fastener, for example.

Extension 52 may be configured appropriately and may extend sufficiently outwardly away from block 50 so that fixture fastener 40 is movably attached to side wall 18. A user may switch from the one size of fixture fastener to the other; namely, from the fixture fastener position in which the indica "8-32" faces outwardly away from top wall 16 in its illustrated use position with face 70 facing outwardly away (as shown in FIG. 1) to a non-use position, that is illustrated as being currently occupied by face 72 (as shown in FIG. 1); i.e., in the position illustrated as being occupied by fastener 44 in FIG. 1.

A groove 74 may be provided on an outwardly extending portion 76 of extension 52.

A corresponding aperture 78 may be sufficiently large so that portion 76 may extend therethrough.

When assembled, after portion 76 has been disposed in and sufficiently extended through aperture 78, and groove 74 is disposed outwardly of side wall 18, a retaining device 80 may be used to secure fixture support 40 to the remainder of junction box 14.

Retaining device 80 may be a retaining ring including a ring portion 82 sized to engage groove 74.

One or more manipulating elements 84 may be provided for attaching/releasing retaining device 80 from fixture support 40; i.e., from groove 74.

Manipulating elements 84 may be in the form of extensions having holes therein that are sized to mate with a conventional retaining ring attachment/removal device, such as a pair of hand-operated pliers or an automated tool.

Figure 5:
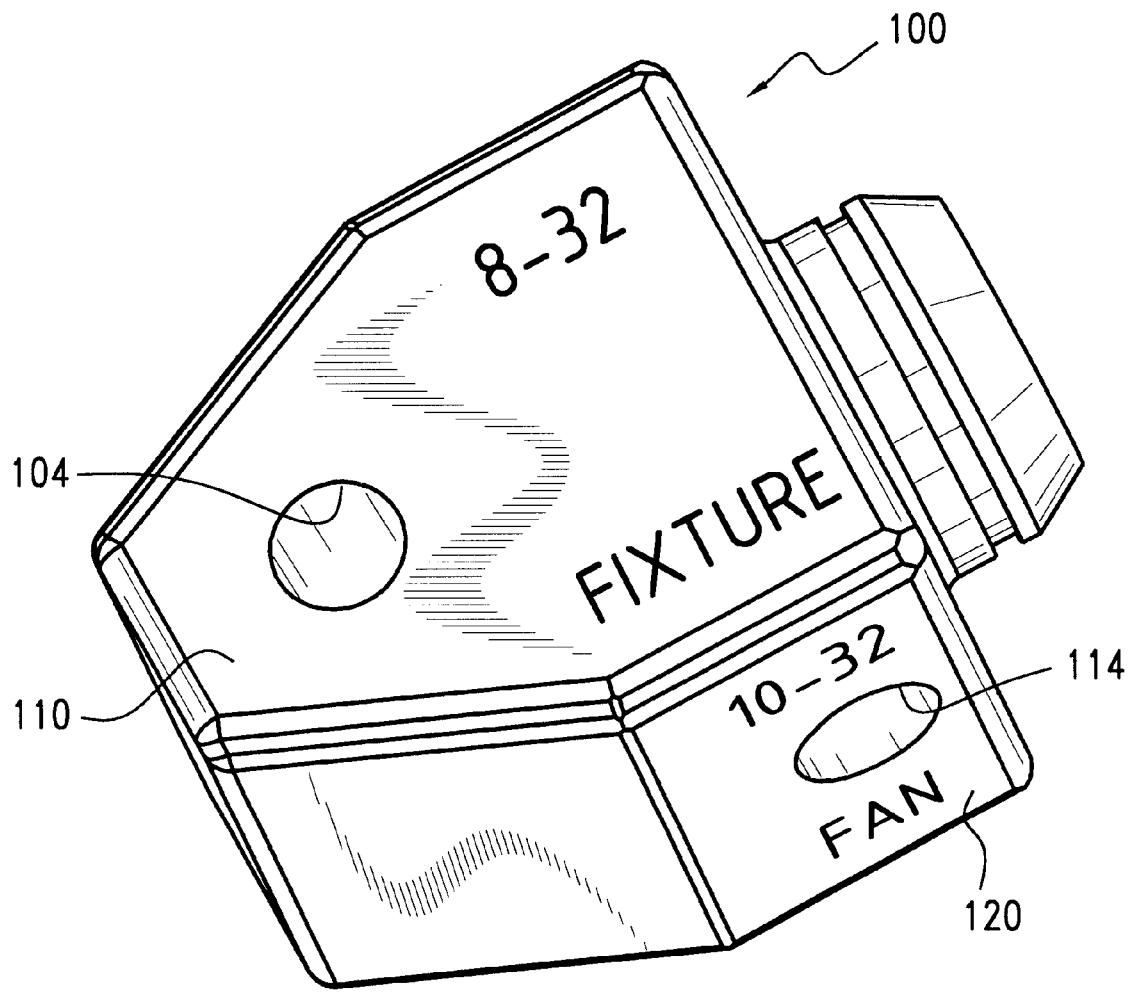
FIG. 5 is a perspective view of another embodiment of a fixture support according to the invention.

FIG. 5 shows another embodiment of a fixture support 100.

It will be readily appreciated that if two(2) of fixture supports 100 are used to replace both of the illustrated fixture supports 40 of FIG. 1, then the user will have, typically, only two(2) choices available, depending on the distance between the paired fixture fastener 104 and the paired fixture fasteners 114, in use. If, for example, fasteners 114 are offset 2¾ inch away from each other, such as in the analogous embodiment of FIG. 3, and the fixture fasteners 104 are offset 2¾ inch away from each other as in FIG. 3, then the user would typically rotate fixture support 100 so that both fixture support faces 110 face outwardly away from the associated junction box. Thus, a 2¾ inch spacing would be established between fixture fasteners 104.

Alternatively, the user would typically rotate fixture support 100 relative to junction box side wall 14 so that both second faces 120 face outwardly away from the top wall 16 of the junction box, so that a 3½ inch spacing is established between the thus paired fixture fasteners 114.

It would, of course, be possible for the user to rotate one of fixture supports 100 so that its first face 110 faces outwardly, and the other one of fixture supports 100 so that its second face 120 faces outwardly. In that manner, a pairing of an 8-32 fixture fastener 104 on one fixture support 100 and a 10-32 fixture fastener 114 on the other fixture support 100 would result. Such could be used in the case where the fixture to be supported required such.

Figure 6:
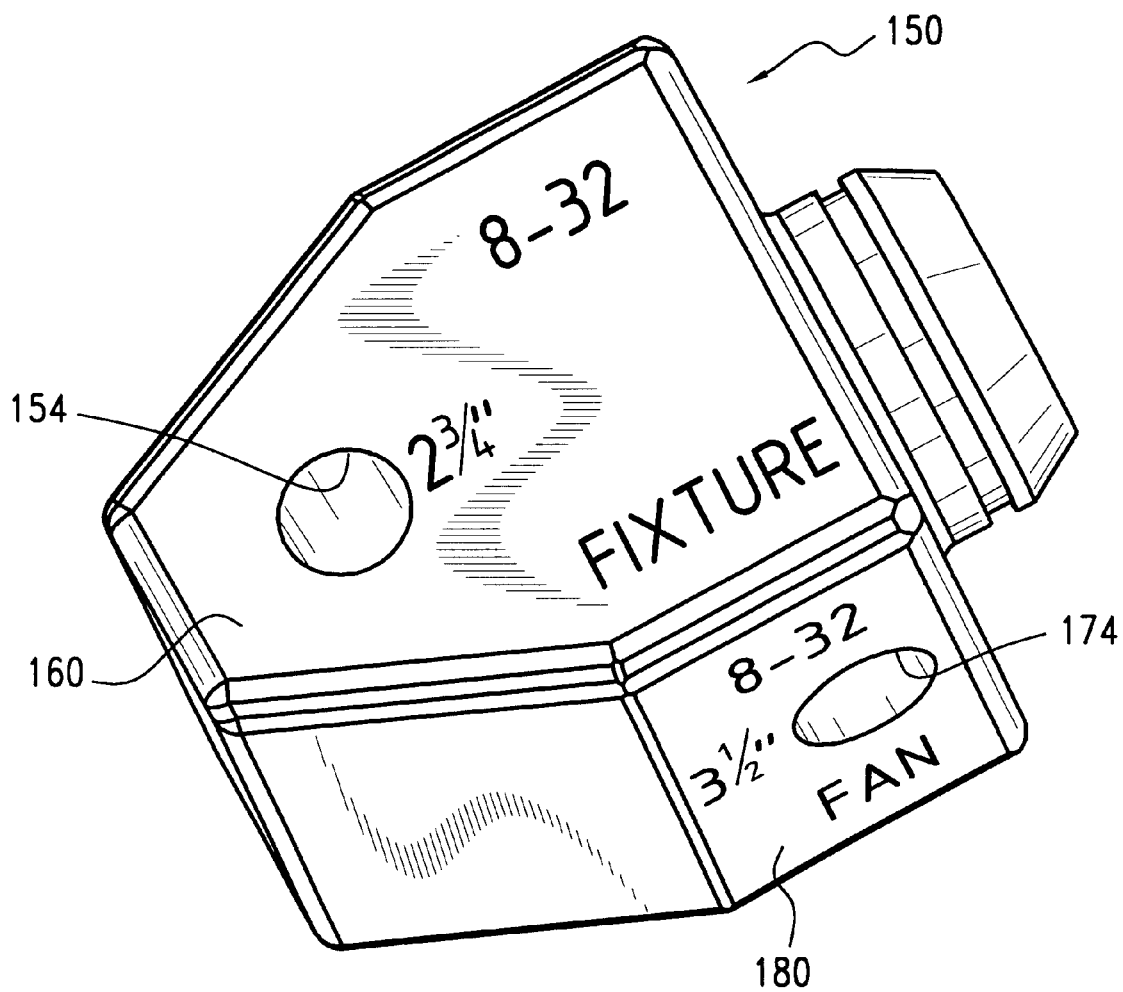
FIG. 6 illustrates an embodiment of the fixture support according to the invention.

FIG. 6 illustrates another embodiment of a fixture support 150 according to the invention. Fixture support 150 includes a first fixture fastener 154 provided in a first face 160 of support 150. Fixture fastener 154 may be, for example, the illustrated 8-32 inch fastener.

A second fixture fastener 174 may be provided in a second face 180 of fixture support 150. As shown, fixture fastener 174 may likewise be an 8-32 inch fixture fastener.

Thus, in the case where a pair of fixture supports 150 are substituted for the two fixture supports 40 in the embodiment of FIG. 1, a junction box configured for supporting a single size of fixture fastener (e.g., an 8-32 fixture fastener, such as used for supporting light fixtures) would result. Yet, the resulting junction box could be used, alternately, for supporting fixtures requiring a 2¾ inch offset width between the supporting fixture fastener or a 3½ inch offset width between the fixture fasteners when a different type of fixture having a different standard offset is to be supported.

Still further, if that junction box having a pair of fixture supports 150 was set so that on one side of the junction box first face 160 faced outwardly away from the box in its use position and the other one of the pair of fixture supports 150 had been rotated so that second face 180 faced outwardly, then paired fixture fastener 154 and 174 would face outwardly in their use positions. In that manner, a third offset width between like-sized (i.e., 8-32 inch) fixture fasteners would be provided. Namely, a 2¾ inch offset width would be provided as will be readily appreciated.

Figure 7:
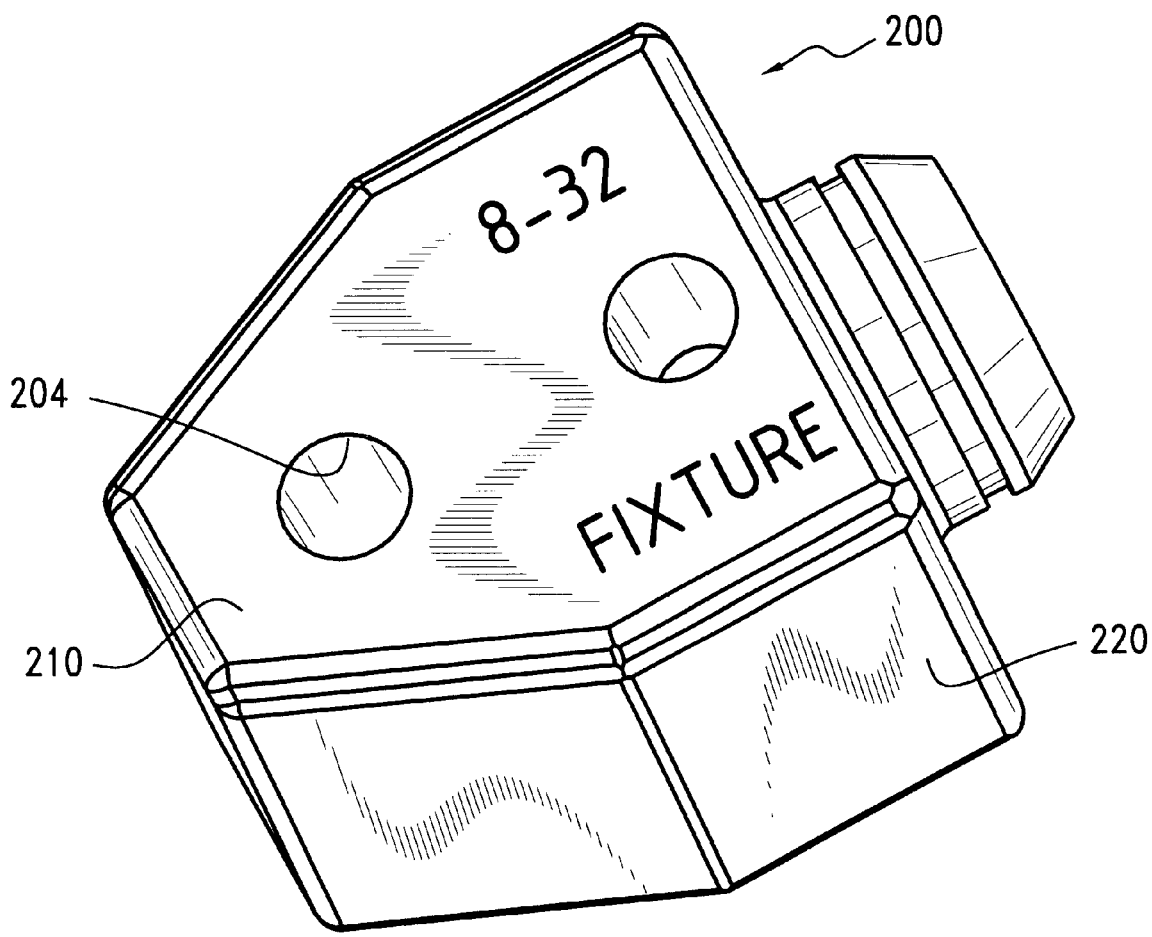
FIG. 7 illustrates a further embodiment of a fixture support according to the invention.

FIG. 7 illustrates another fixture support 200 having a first face 210 in which a first fixture fastener 204 is provided.

Fixture fastener 204 may be sized as an 8-32 inch fixture fastener, as shown, for example. A second face 220 may be free of fixture fasteners. The embodiment of fixture support 200 of FIG. 7 could be used in a manner analogous to the use of fixture support 150 of FIG. 6, and like offsets between spaced apart fixture supports could be achieved. Different offset widths between like sizes of fixture fasteners 204 could be achieved without the need to present different faces of fixture support 200, as may be necessary in the embodiment of FIG. 6.

Figure 8:
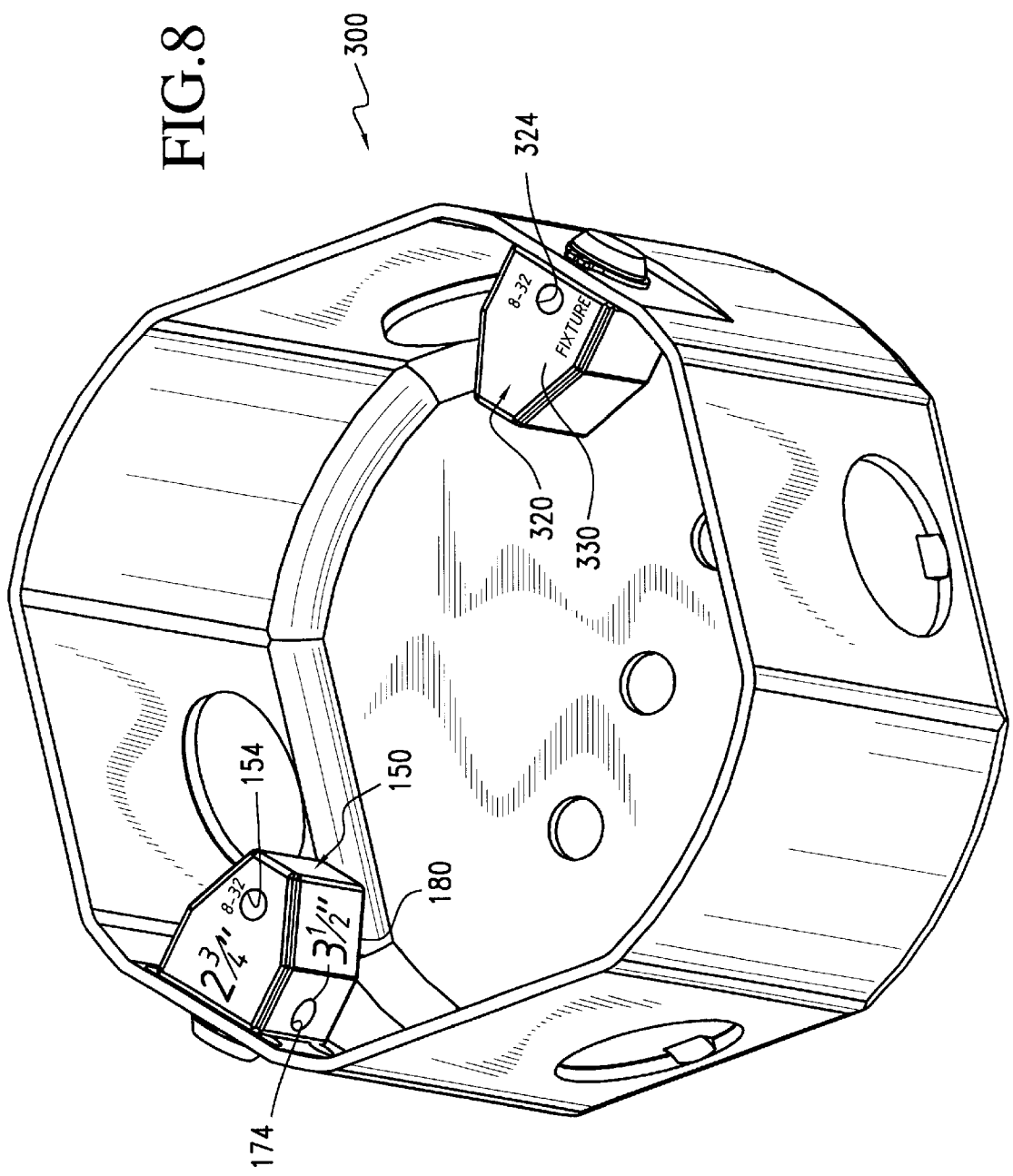
FIG. 8 illustrates another embodiment of an electrical box according to the invention.

FIG. 8 shows a mounting assembly 300 according to a further embodiment of the invention.

Junction box 300 includes a fixture support 150 as shown in FIG. 6. In addition, a further embodiment of a fixture support 320 having, for example, a single fixture fastener 324 is provided. The spacing between fixture fastener 324 and fixture fastener 154 and 174 is selected so that one can alternately use junction box 300 for supporting either a fixture having an offset width of 2¾ inch or a fixture having a 3½ inch offset width.

Thus, as shown, with a first face 330 of fixture support 320 facing outwardly away from junction box 300 and hence, fixture fastener 324 facing outwardly, as well as a fixture fastener 154 facing outwardly, the offset width between fixture fastener 154 and fixture fastener 324 could be set at 2¾ inch.

In order to achieve a 3½ inch offset width for fixtures requiring such, fixture support 150 would be rotated so that second face 180 faces outwardly away from junction box 300; and fixture support 320 would be as shown in FIG. 8; i.e., with face 330 and, hence, fixture fastener 324 facing outwardly away from the remainder of box 300.

Figure 9:
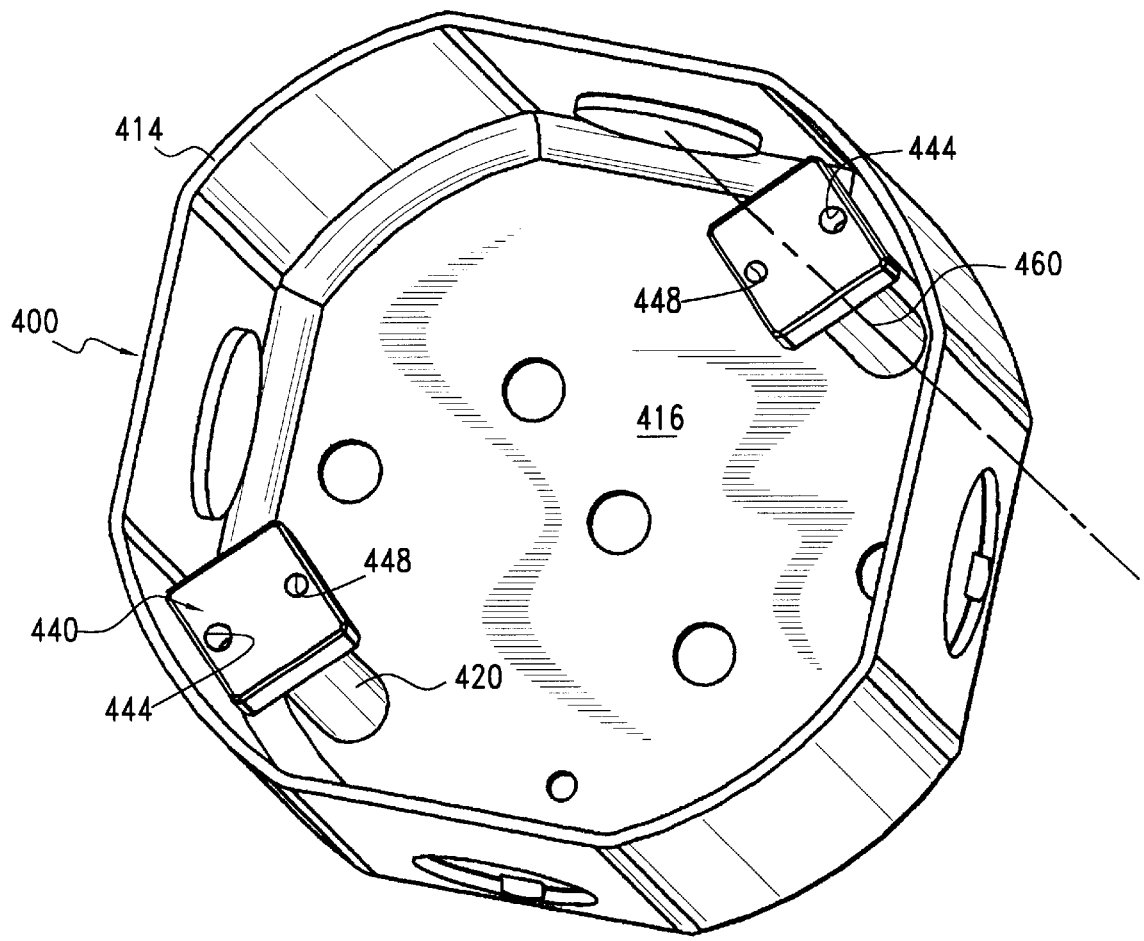
FIG. 9 shows another embodiment of a mounting assembly according to the invention.

FIG. 9 illustrates a further embodiment of a junction box 400 according to the invention. Junction box 400 may include a sidewall 414 and a top wall 416. Sidewall 414 may extend downwardly away from top wall 416 and define a cavity of a junction box 400.

One or more fixture supporting supports 420 may be provided. Support 420 may be provided adjacent to top wall 416 and/or sidewall 414.

One or more fixture supports 440 may be provided on support 420. One or more of fixture supports 440 may be movable relative to support 420. Fixture support 440 may include a first type of fixture fastener 444 and a second type of fixture fastener 448. One or both of fixture fasteners 444 and 448 may be moved from a first use position to a second use position. For discussion purposes, the two illustrated fixture fasteners 448 may be considered to be in their respective first use positions. In such a case, fixture fasteners 448 would be offset from each other at a desired distance (e.g., 2¾ inches) for securing a fixture to be supported by fixture fastener 448.

It will be appreciated that the position presently occupied by one or both of fixture fasteners 444 could just as well be the first use position of fixture fastener 444 and the position of one or both of fixture fasteners 448 could be the second position for when a second use position for fixture fasteners 444 is desired.

The illustrated distance between offset fasteners 444 could be 3½ inches, analogous to the uses described above.

Fixture support 440 may be moveable from a first use position for fixture fastener 448, for example to a second use position for fixture fastener 448 by rotation about an axis 460, for example.

It will be appreciated that each of the mounting assemblies, junction boxes, and all components of each of the embodiments may be made of a variety of materials, including metals, plastics, any metal alloys, iron, and synthetic materials.

The offset width markings may be provided on the box.

Any of the junction boxes may be provided in any other shape, such as circular boxes, which may even be so-called "pancake" boxes which are conventionally relatively shallow and have a circular configuration, as opposed to the squared off or "octagonal" shape of the illustrated boxes.

The fixture fasteners may be constructed having different depths (e.g., lengths of internal threading in the case of female fixture fasteners) to accommodate different expected weights of fixtures to be supported.

The illustrated fixture fasteners may be male or female fasteners depending on the intended use.

The illustrated female fastener(s) provided on the fixture supports may be somewhat oval, instead of the conventional circular configuration, in case the dimensions of the junction box and, hence, the offset between spaced apart paired fixture fasteners which determine the offset width, are not manufactured to the expected tolerances. In other words, if the spaced apart downwardly extending walls of the junction box to which the fixture fasteners are attached are not at the expected spaced apart widths and/or the finished offset between the spaced apart fixture fasteners are not at the expected widths for whatever reason, a somewhat oval female fastener can be used to compensate for such variation.

It is likewise contemplated that a bar having multiple fixture fasteners therein be provided which may extend across the entire width of the junction box, and may be used instead of the two spaced apart pairs of fixture supports shown.

Further, the offset widths; i.e., the center-to-center standard offsets, may be any of a number of widths, including 2¾ inch or 3½ inch, for example.

A strap to adapt the junction box to accommodate a different offset width may optionally be provided with the junction box.

More fixture fasteners or fewer fixture fasteners than illustrated and described above can be provided.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

In the claims:

1. A mounting assembly, comprising:
   a) a junction box including a top wall and a downwardly extending side wall defining a cavity therein;
   b) a first fixture support provided adjacent the junction box;
   c) said first fixture support being rotatable relative to the junction box;
   d) a first fixture fastener and a second fixture fastener being provided on the first fixture support;
   e) a second fixture support being provided adjacent the junction box;
   f) a third fixture fastener being provided on the second fixture support;
   g) the first and third fixture fasteners being spaced apart at a first offset width;
   h) the second and third fixture fastener being spaced apart at a second offset width, the second offset width being different from the first offset width.

2. A mounting assembly as in claim 1, wherein:
   a) the first fixture support is rotatable from a first use position to a second use position, in the first use position the first fixture fastener is disposed so that it is usable with said third fixture fastener.

3. A mounting assembly as in claim 2, wherein:
   a) in the second use position the second fixture fastener is disposed so that it is usable with said third fixture fastener.

4. A mounting assembly as in claim 1, wherein:
   a) the first fixture fastener is usable for securing a first size of fixture fastener.

5. A mounting assembly as in claim 2, wherein:
   a) the first fixture fastener includes a female fastener.

6. A mounting assembly as in claim 1, wherein:
   a) the first fixture fastener includes a female fastener.

7. A mounting assembly as in claim 1, wherein:
   a) the first fixture support includes a block.

8. A mounting assembly as in claim 7, wherein:
   a) the block includes a first face and a second face; and
   b) the first face faces substantially outwardly away from the top wall when the first fixture fastener is in a first use position.

9. A mounting assembly as in claim 7, wherein:
   a) the block includes a first face and a second face;
   b) the first face faces substantially outwardly away from the top wall when the first fixture fastener is in a first use position; and
   c) the second face faces transversely to the top wall when the first fixture fastener is in its first use position.

10. A mounting assembly as in claim 7, wherein:
    a) the block includes a first face and a second face;

b) the first fixture fastener is provided on the first face.

11. A mounting assembly as in claim 10, wherein:
a) the second fixture fastener is provided on the second face.

12. A mounting assembly, comprising:
a) a junction box having a top wall and a downwardly extending side wall defining a cavity therein;
b) a fixture support attached to the junction box;
c) a first fixture fastener provided on the fixture support;
d) a second fixture fastener provided on the fixture support, the second fixture fastener being spaced apart from the first fixture fastener at a first fixed offset width;
e) a third fixture fastener provided on the fixture support, the third fixture fastener being spaced apart from the first fixture fastener at a second fixed offset width;
f) the second fixed offset width differing from the first fixed offset width;
g) a fourth fixture fastener is provided on the fixture support;
h) the first and fourth fixture fastener are sized for securing a first size of fixture fastener;
i) the second and third fixture fastener are sized for securing a second size of fixture fastener; and
j) the fixture support is rotatable relative to the junction box.

13. A mounting assembly as in claim 12, wherein:
a) the first fixture fastener and the second fixture fastener are each sized for securing a first size of fixture fastener.

14. A mounting assembly as in claim 13, wherein:
a) the third fixture fastener is sized for securing a first size of fixture fastener.

15. A mounting assembly as in claim 12, wherein:
a) the fixture support includes a first and a second spaced apart fixture support;
b) the first and second fixture fastener are disposed on the first fixture support; and
c) the third fixture fastener is provided on the second fixture support.

16. A mounting assembly, comprising:
a) a junction box including a top wall and a side wall defining a cavity therein;
b) a first fixture support rotatably attached to the side wall for rotation about an axis extending transversely to the sidewall;
c) a first fixture fastener provided on the first fixture support, the first fixture fastener being sized for engaging a first size of fastener; and
d) the first fixture support being rotatable between a use position and a non-use position, the first fixture fastener being disposed for a engaging a first fastener when in the use position.

17. A mounting assembly as in claim 16, wherein:
a) a second fixture fastener is provided on the first fixture support, the second fixture fastener being sized for engaging a second size of fixture fastener.

18. A mounting assembly as in claim 16, wherein:
a) the size of the first fixture fastener differs from the size of the second fixture fastener.

19. A mounting assembly as in claim 16, wherein:
a) the first fixture fastener includes a female fastener.

20. A mounting assembly as in claim 16, wherein:
a) a second fixture support is provided spaced apart from the first fixture support; and b) a further fixture fastener is provided on the second fixture support.

21. A mounting assembly as in claim 20, wherein:
a) said second fixture support is movable relative to one of the top wall and side wall of the junction box.

22. A mounting assembly as in claim 1, wherein:
a) the first fixture support is disposed at least in part within the cavity.

23. A mounting assembly as in claim 1, wherein:
a) the first fixture support is disposed substantially completely within the cavity.

24. A mounting assembly as in claim 12, wherein:
a) the fixture support includes a first fixture support and a second fixture support spaced apart from the first fixture support; and
b) the first fixture fastener is provided on the first fixture support, and the second fixture fastener is provided on the second fixture support.

25. A mounting assembly as in claim 24, wherein:
a) the third fixture fastener is provided on the second fixture support.

26. A mounting assembly as in claim 12, wherein:
a) the fixture support includes a fifth fixture fastener.

27. A mounting assembly as in claim 26, wherein:
a) the fifth fixture fastener is sized for securing a first size of fixture fastener.

28. A mounting assembly as in claim 12, wherein:
a) the fixture support is rotatably attached to the junction box for rotation about an axis extending transversely to the side wall.

29. A mounting assembly as in claim 12, wherein:
a) the fixture support is rotatably attached to the junction box for rotation about an axis extending substantially perpendicularly to the side wall.

30. A mounting assembly as in claim 8, wherein:
a) the first fixture fastener and said second fixture fastener are disposed on the first face; and
b) the first fixture fastener is disposed substantially between the side wall and the second fixture fastener.

31. A mounting assembly, comprising:
a) a junction box having a top wall and a downwardly extending side wall defining a cavity therein;
b) a fixture support rotatably attached to the junction box;
c) a first fixture fastener provided on the fixture support;
d) a second fixture fastener provided on the fixture support, the second fixture fastener being spaced apart from the first fixture fastener at a first fixed offset width;
e) a third fixture fastener provided on the fixture support, the third fixture fastener being spaced apart from the first fixture fastener at a second fixed offset width; and
f) the second fixed offset width differing from the first fixed offset width.

32. A mounting assembly as in claim 31, wherein:
a) the fixture support is rotatably attached to the junction box for rotation about an axis extending transversely to the side wall.

33. A mounting assembly as in claim 31, wherein:
a) the fixture support is rotatably attached to the junction box for rotation about an axis extending substantially perpendicularly to the side wall.

34. A mounting assembly as in claim 31, wherein:
a) the first fixture fastener is disposed substantially between the side wall and the second fixture fastener.

35. A mounting assembly as in claim 31, wherein:
a) the first fixture fastener and the second fixture fastener are each sized for securing a first size of fixture fastener.

36. A mounting assembly as in claim 31, wherein:
a) the fixture support includes a first and a second spaced apart fixture support;
b) the first and second fixture fastener are disposed on the first fixture support; and
c) the third fixture fastener is provided on the second fixture support.

37. A mounting assembly, comprising:
a) a junction box including a top wall and a downwardly extending side wall defining a cavity therein;
b) a first fixture support provided adjacent the junction box;
c) said first fixture support being rotatable relative to the junction box;
d) a first fixture fastener and a second fixture fastener being provided on the first fixture support;
e) a second fixture support being provided adjacent the junction box;
f) a third fixture fastener being provided on the second fixture support;
g) the first and third fixture fasteners being spaced apart at a first offset width; and
h) a fourth fixture fastener being provided on the second fixture support.

38. A mounting assembly as in claim 37, wherein:
a) the first fixture support is rotatable from a first use position to a second use position, in the first use position the first fixture fastener is disposed so that it is usable with said third fixture fastener.

* * * * *